US 7,120,104 B2

United States Patent
Cho et al.

(10) Patent No.: US 7,120,104 B2
(45) Date of Patent: Oct. 10, 2006

(54) EQUALIZER FOR OPTICAL RECORDING/REPRODUCING APPARATUS AND EQUALIZING METHOD THEREOF

(75) Inventors: Eing-seob Cho, Seoul (KR); Jae-wook Lee, Ohsan (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 561 days.

(21) Appl. No.: 10/657,124

(22) Filed: Sep. 9, 2003

(65) Prior Publication Data

US 2004/0141449 A1    Jul. 22, 2004

(30) Foreign Application Priority Data

Jan. 20, 2003    (KR)    ............... 10-2003-0003799

(51) Int. Cl.
*G11B 7/00* (2006.01)
(52) U.S. Cl. ................. 369/59.16; 369/59.22
(58) Field of Classification Search ............ 369/59.15, 369/59.16, 59.22
See application file for complete search history.

(56) References Cited

U.S. PATENT DOCUMENTS

| 5,539,774 A | 7/1996 | Nobakht et al. |
| 6,356,555 B1 * | 3/2002 | Rakib et al. ............ 370/441 |

OTHER PUBLICATIONS

Min Jin et al., "A novel timing recovery scheme for FDTS/DF detector", Globecom'l. 2001 IEEE Global Telecommunications Conference, San Antonio, TX, Nov. 25-29, 2001, IEEE Global Telecommunications Conference, New York, NY:IEEE, US vol. 5 of 6, Nov. 25, 2001, pp. 3029-3033, XP010747372.

Bracken K C et al., "Adaptive Continuous-Time Equalization and FDTS/DF Sequence Detection", IEEE Transactions on Magnetics, IEEE Inc. New York, US, vol. 31, No. 6, Nov. 1995, pp. 3048-3050, XP002064507.

Moon J et al., "Performance Comparison of Detection Method in Magnetic Recording", IEEE Transactions on Magnetics, IEEE Inc. New York, US, vol. 26, No. 6, Nov. 1990, pp. 3155-3172, XP000200747.

Carley L R et al., "Comparison of Computationally Efficient Forms of FDTS/DF Against PR4-ML", IEEE Transactions on Magnetics, IEEE Inc. New York, US, vol. 27, No. 6, Nov. 1, 1991, pp. 4567-4572, XP000257379.

Wei D C et al., "An Analog EPR4 Read Channel with an FDTS Detector", ICC'98. 1998, IEEE International Conference on Communications. Conference Record. New Century Communications. Atlanta, GA, Jun. 7-11, 1998, IEEE International Conference on Communications, New York, NY:IEEE, US, vol. 2 Conf. 5, Jun. 7, 1998, pp. 678-682, XP000890959.

(Continued)

*Primary Examiner*—Nabil Hindi
(74) *Attorney, Agent, or Firm*—Sughrue Mion, PLLC

(57) ABSTRACT

An equalizer and an equalizing method of optical recording/reproducing apparatus capable of enhancing equalizing performance and equalizing speed are disclosed. The equalizer includes a FF unit having a feedforward filter for removing pre-cursor from inter-symbol interference of input signal, a FB unit having a feedback filter for predicting post-cursor of the inter-symbol interference and outputting it, a first adder and a second adder for adding the signal from the FF unit and the signal from the FB unit, to remove the inter-symbol interference, a slicer for deciding the level of the signal from the first adder to be a predetermined level and feeding back the level-decided signal to the FB unit, and a signal detection unit for outputting the signal having the inter-symbol interference removed by the second adder as a predetermined signal using at least one of a trellis structure method and a tree structure method.

16 Claims, 7 Drawing Sheets

OTHER PUBLICATIONS

Ke Han et al., "On the Performance and Implementation of Adaptive PRML", Global Telecommunications Conference 1995. Conference Record. Communication Theory Mini-Conference, Globecom '95., IEEE Singapore Nov. 13-17, 1995, New York, NY USA, IEEE, US, vol. 1, Nov. 13, 1995, pp. 554-558, XP010607618.

Jo Hoon Jung et al., "Implementation of an FDTRS/DF Signal Detector for High-Density DVD Systems", IEEE Transactions on Consumer Electronics, IEEE Inc. New York, US, vol. 46, No. 4, Nov. 2000, pp. 1064-1072, XP001197669.

Eing Seob Cho, Yong Soo Cho., "An Advanced Signal Detection Technique for Digital Versatile Disc Systems", Japanese Journal of Applied Physics, vol. 40, No. 3b, Mar. 2001, pp. 1723-1726, XP002335647.

* cited by examiner

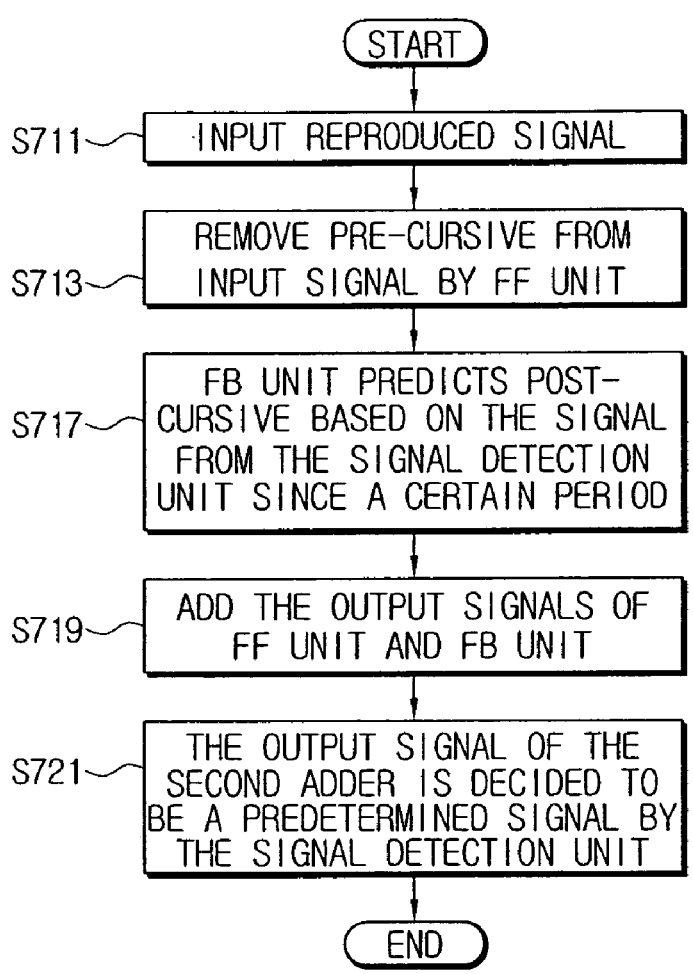

EQUALIZER FOR OPTICAL RECORDING/REPRODUCING APPARATUS AND EQUALIZING METHOD THEREOF

This application claims the priority of Korean Patent Application No. 2003-3799, filed on Jan. 20, 2003, in the Korean Intellectual Property Office, the disclosure of which is incorporated herein in its entirety by reference.

BACKGROUND

1. Field of the Invention

The present invention generally relates to an optical recording/reproducing apparatus, and more particularly to an equalizer and an equalizing method in which the inter-symbol interference of reproduced signal passed through channel is removed in reproducing apparatus that reproduces data recorded on recording medium.

2. Description of the Related Art

Recently, with the advance of multimedia information, as demands on the storage and the transmission of digital data having a greater capacity are on the increase, the studies on optical recording media such as DVD have actively progressed. At the present, DVD market has been grown on the basis of computer industry desiring to adopt DVD-ROM and home appliance industry wishing to adopt DVD-Video. Besides, write-once type DVDR, rewritable type DVD-RW, and DVD-RAM are on the market, and hence the application fields of the optical recording medium have been expanded. In addition, in the future, studies with respect to the HDTV have actively progressed. HD-DVD has a size equal to that of CD, DVD, but has a storage capacity above 15 GB. By the use of a blue laser and the use of less track pitch and minimal pitch length, a higher density channel is possible. However, since the inter-symbol interference increases with the density of the channel information being increased, the quality of the reproduced signal is degraded and hence there exist many difficulties in correctly reproducing the recorded data.

In order to solve the foregoing problems described above, conventionally, the reproduced data having the inter-symbol interference (ISI) generated through the channel is outputted as a correctly reproduced data through the equalizing process of decision feedback equalizer (DFE) described below.

FIG. 1 is a schematic block diagram showing an equalizer having a general DFE structure for removing the inter-symbol interference (ISI) generated in the reproduced signal of the conventional optical recording/reproducing apparatus.

The equalizer 10 comprises FeedForward (FF) unit 11, FeedBack (FB) unit 12, an adder 13, a slicer 14, and an error calculating unit 15.

FF unit 11 has a feedforward filter, and removes pre-cursor from the inter-symbol interference of the reproduced signal.

FB unit 12 has a feedback filter, and predicts post-cursor of the inter-symbol interference of the reproduced signal.

The adder 13 outputs the signal having the inter-symbol interference removed by adding the reproduced signal having the pre-cursor removed by the FF unit 11 and the reproduced signal having the post-cursor predicted by the FB unit 12.

The slicer 14 decides the level of the signal added at the adder 13 to be a predetermined level, and outputs the level-decided signal. The level-decided signal output from the slicer 14 is fed back to FB unit 12.

The error calculating unit 15 calculates equalizing error value by using the signal from the adder 13 and the signal from the slicer 14. The equalizing error value calculated is then inputted to FF unit 11 and FB unit 12, where the tap coefficients of the respective filter tap are updated in accordance with the inputted equalizing error value.

The conventional equalizer having DFE structure described above has an advantage in that a fast equalizing speed be can obtained with a relatively less number of taps, but there is a disadvantage in that the reliability of the signal inputted to the feedback filter, i.e., the signal level decided at the slicer 14 degrades, and accordingly, the equalizing performance degrades.

In order to solve the defects of the equalizer of such DFE structure, the equalizer 20 shown in FIG. 2 is used wherein the signal with the level decided by FDTS/DF (Fixed Delay Tree Search with Decision Feedback) method and FDTrS/DF (Fixed Delay Trellis Search with Decision Feedback) method is inputted to the feedback filter.

The equalizer 20 has the equalizer (DFE) 10 shown in FIG. 1 added with a signal detection unit 26 of FDTS/DF method or FDTrS/DF method.

FF unit 21 removes pre-cursor from the reproduced signal by the feedforward filter.

FB unit 22 predicts and outputs post-cursor of the inter-symbol interference of the input signal, i.e., the reproduced signal by the feedback filter.

A first adder 23 removes the inter-symbol interference from the input signal by adding the signal having the pre-cursor removed by the FF unit 21 and the post-cursor predicted by the FB unit 22.

The slicer 24 decides the level of the signal outputted from the first adder 23 to be a predetermined level and outputs it. The error calculating unit 25 calculates equalizing error value based on the signal from the first adder 23 and the signal from the slicer 24. The equalizing error value calculated is inputted to FF unit 21 and FB unit 22, where the tap coefficients of the respective filter are updated based on the inputted equalizing error value.

The signal detection unit 26 outputs $\tau$ signals of decided levels using any one of FDTS/DF method and FDTrS/DF method having a fixed decision delay ($\tau$), and feedbacks the signal with the decided level to FB unit 22. FB unit 22 predicts the remaining post-cursors except for $\tau$ post-cursors and outputs them to a second adder 27.

The second adder 27 adds the signal having the pre-cursor removed by the FF unit 21 to the post-cursor predicted by FB unit 22 based on the feedback signal of the signal detection unit 26 and outputs the added signal. The signal output from the second adder 27 is inputted to the signal detection unit 26, and outputted as a predetermined level signal.

In accordance with the conventional equalizer having the configuration above, it is possible to enhance the equalizing performance by inputting the signal in the level decided by FDTS/DF method or FDTrS/DF method of the signal detection unit 26 to the feedback filter. However, due to additional computational amount caused by the operational characteristic of the signal detection unit 26 of FDTS/DF method or FDTrS/DF method, there is generated a substantial amount of time delay in deciding the signal level. Accordingly, there exists a problem in that the overall operating speed of the equalizer degrades.

SUMMARY OF THE INVENTION

Therefore, the present invention is made in order to overcome the problems described above.

It is an object of the present invention to provide an equalizer and equalizing method of optical recording/reproducing apparatus that has a signal detection unit of FDTS/DF or FDTrS/DF method with improved operating speed.

In order to accomplish the above objects and/or other features of the present invention, an equalizer of an optical recording/reproducing apparatus according to an exemplary embodiment of the present invention includes a FF unit having a feedforward filter for removing pre-cursor from inter-symbol interference of input signal, a FB unit having a feedback filter for predicting post-cursor of the inter-symbol interference and outputting the result of the prediction, a first adder and a second adder for adding the signal from the FF unit and the signal from the FB unit, to remove the inter-symbol interference, a slicer for deciding the level of the signal from the first adder to be a predetermined level and feeding back the level-decided signal to the FB unit, and a signal detection unit for outputting the signal having the inter-symbol interference removed by the second adder as a predetermined signal, using at least one of trellis structure method and tree structure method.

Further provided are an error calculating unit for calculating equalizing error value, using the signal from the first adder and the level-decided signal from the slicer. The FF unit and the FB unit update respective tap coefficients of the feedforward filter and the feedback filter based on the equalizing error value.

The signal detection unit comprises a given number of delay elements corresponding to a reference clock of the optical recording/reproducing apparatus. Accordingly, the signal from the signal detection unit is outputted after being delayed for a certain period of time, and is outputted in synchronization with the reference clock after the certain period of time.

The trellis structure method and the tree structure method have a given decision delay ($\tau$), where $\tau \geq 3$.

According to an exemplary embodiment of the present invention, there is provided an equalizing method of optical recording/reproducing apparatus including the pre-cursor removing step of removing pre-cursor from inter-symbol interference of input signal by a feedforward filter, the post-cursor predicting step of predicting post-cursor of the inter-symbol interference and outputting the result of prediction by a feedback filter, the first and the second signal adding steps of adding the signal having the pre-cursor removed and the signal having the post-cursor predicted, to remove the inter-symbol interference, the level deciding step of deciding the level of the signal from the first adder to be a predetermined level and feeding back the level-decided signal to the feedback filter, and the signal detecting step of detecting the signal outputted from the second adding step as a predetermined signal, using at least one of trellis structure method and tree structure method.

Further provided are the step of calculating equalizing error value using the signal outputted from the first adding step and the level-decided signal and updating respective tap coefficients of the feedforward filter and the feedback filter.

The signal from the detection step is outputted after being delayed for a certain period of time by a given number of delay elements corresponding to a reference clock of the optical recording/reproducing apparatus, and is outputted in synchronization with the reference clock after the certain period of time.

The trellis structure method and the tree structure method have a given decision delay ($\tau$), where $\tau \geq 3$.

According to another exemplary embodiment of the present invention, there is provided an equalizer of optical recording/reproducing apparatus including a FF unit having a feedforward filter for removing pre-cursor from inter-symbol interference of input signal, a FB unit having a feedback filter for predicting post-cursor of the inter-symbol interference and outputting the result of prediction, a first adder and a second adder for adding the signal from the FF unit and the signal from the FB unit, to remove the inter-symbol interference, and a signal detection unit for detecting the signal from the second adder as a predetermined signal using at least one of trellis structure method and tree structure method, and feeding back the detected given signal to the FB unit. The FB unit predicts the post-cursor based on the predetermined signal that is feedback from the signal detection unit after a certain period of time.

Further provided are a slicer for deciding the level of the signal from the first adder to be a predetermined level and feeding back the level-decided signal to the FB unit, and an error calculating unit for calculating equalizing error value, using the signal from the first adder and the level-decided signal in the slicer. The FF unit and the FB unit update respective tap coefficients of the feedforward filter and the feedback filter based on the equalizing error value.

The signal detection unit comprises a given number of delay elements corresponding to a reference clock of the optical recording/reproducing apparatus, whereby the signal from the signal detection unit is outputted after being delayed for a certain period of time, and is outputted in synchronization with the reference clock after the certain period of time.

The trellis structure method and the tree structure method have a given decision delay ($\tau$), where $\tau \geq 3$.

According to the embodiment of the present invention, there is provided an equalizing method of optical recording/reproducing apparatus including the pre-cursor removing step of removing pre-cursor from inter-symbol interference of input signal by a feedforward filter, the post-cursor predicting step of predicting post-cursor of the inter-symbol interference and outputting the result of prediction by a feedback filter, the first and the second signal adding steps of adding the signal having the pre-cursor removed and the signal having the post-cursor predicted, to remove the inter-symbol interference, and the first feedback step of detecting the signal outputted from the second adding step as a predetermined signal, using at least one of trellis structure method and tree structure method and feeding back the detected predetermined signal to the feedback filter. The first feedback step inputs the detected predetermined signal to the feedback filter after a certain period of time.

Further provided are the second feedback step of deciding the signal outputted from the first adding step to be a predetermined level and feeding back the level-decided signal to the FB unit, and the step of calculating equalizing error value using the signal outputted from the first adding step and the level-decided signal and updating respective tap coefficients of the feedforward filter and the feedback filter.

The signal from the second feedback step is outputted after being delayed for a certain time by a given number of delay elements corresponding to a reference clock of the optical recording/reproducing apparatus, and is outputted in synchronization with the reference clock after the certain period of time.

The trellis structure method and the tree structure method have a given decision delay ($\tau$), where $\tau \geq 3$.

Therefore, it is possible to realize an equalizer having a high equalizing speed and enhanced equalizing performance.

BRIEF DESCRIPTION OF THE DRAWINGS

The embodiments of the present invention will be explained with reference to the accompanying drawings, in which:

FIG. 7 is a flow chart explaining the operations of the equalizer 200 shown in FIG. 6.

DETAILED DESCRIPTION OF THE INVENTION

The above objects, other objects, features and advantages of the present invention will be better understood from the following description taken in conjunction with the attached drawings.

Figure 1:
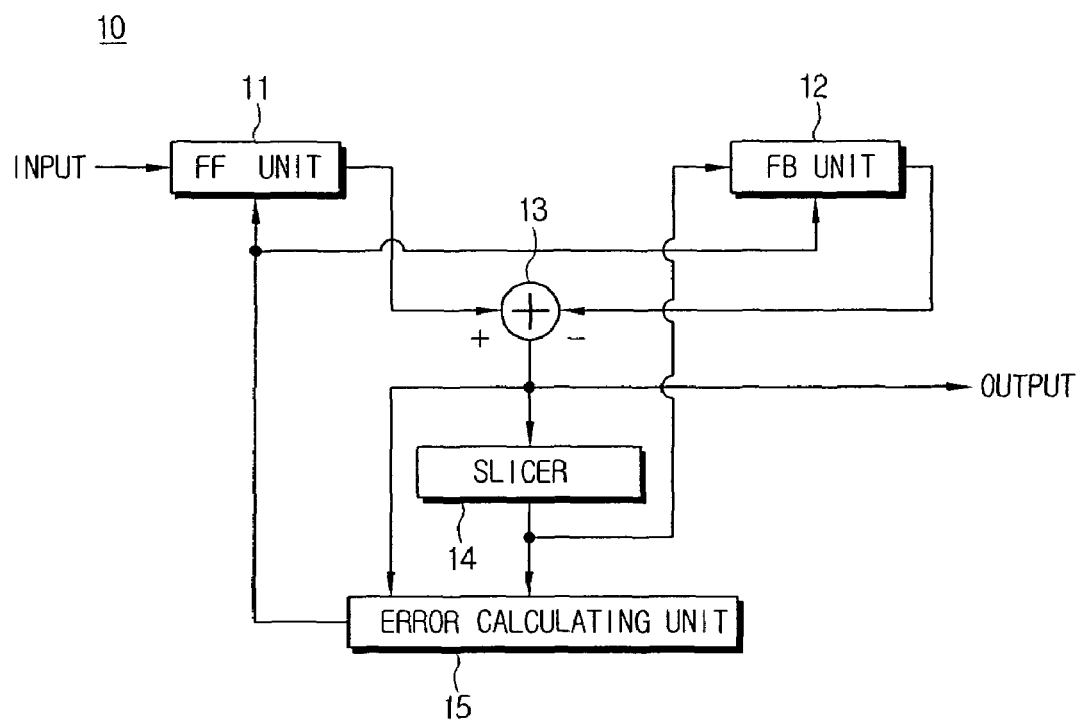
FIG. 1 is a schematic block diagram showing the conventional equalizer having a general DFE structure.
Figure 2:
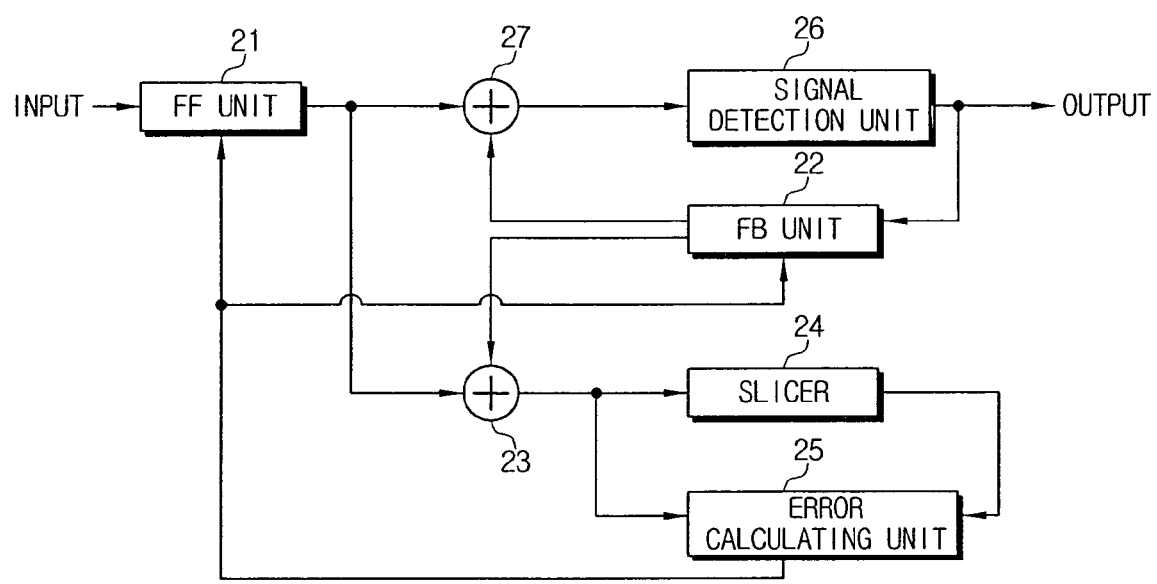
FIG. 2 is a schematic block diagram showing the conventional equalizer employing FDTS/DF method or FDTrS/DF method.
Figure 3:
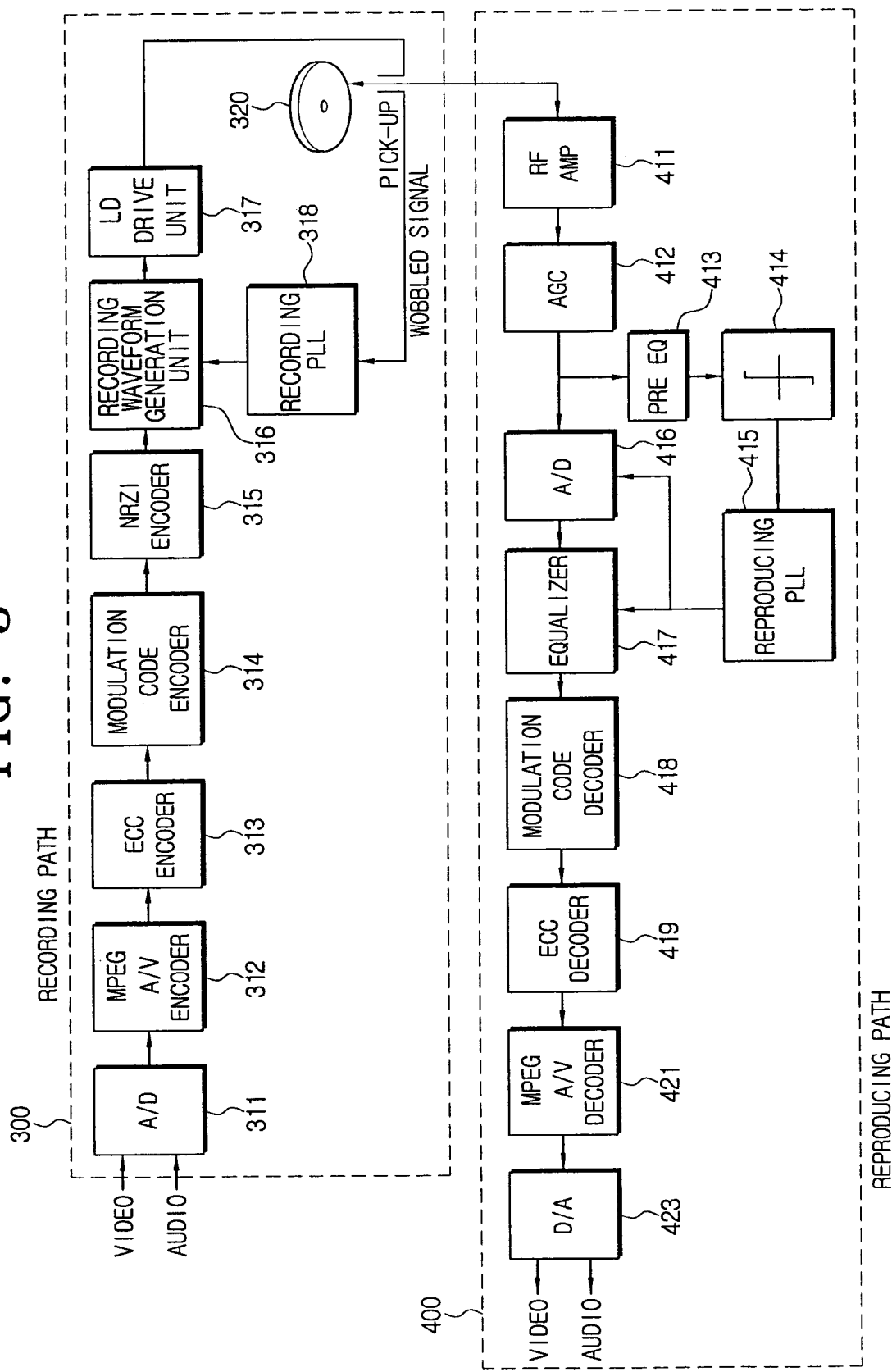
FIG. 3 shows a general configuration of the optical recording/reproducing apparatus having equalizer according to the present invention.

FIG. 3 is a general block diagram of the optical recording/reproducing apparatus separated into recording path 300 and reproducing path 400 in correspondence with operation mode in the optical recording/reproducing apparatus having equalizer according to the present invention.

The optical recording path 300 comprises A/D converter 311 for digitizing audio signal and video signal, MPEG A/V encoder 312 for encoding the converted signal to MPEG format, ECC encoder 313 for performing error correction encoding on the signal encoded to MPEG format, a modulation code encoder 314 for modulating baseband signal into signal appropriate for transmission, NRZI (Non return to Zero Inverse) encoder 315 for preventing error in transmission, recording waveform generating unit 316 for generating the recording waveform based on the characteristic of optical recording medium 320, LD drive unit 317 for driving photo-diode with the recording wave form, and recording PLL (Phase Locked Loop) 318 for carrying out synchronization when recording data.

Next, the reproducing path 400 comprises RF amplifier 411 for reading out data from the optical recording medium 320 and amplifying the data, AGC circuitry unit 412 for controlling the gain of the RF amplified signal, pre-equalizer (PreEQ) 413, a differentiator 414 for differentiating the output of the pre-equalizer 413, a reproducing PLL 415 for detecting synchronization when reproducing data, A/D converter 416 for digitizing the gain controlled signal, an equalizer 417 of FDTS/DF method or FDTrS/DF method, a modulation code decoder 418 for decoding modulated encoded signal, ECC decoder 419 for decoding the ECC encoded signal, MPEG A/V decoder 421 for decoding the encoded signal to MPEG format, and D/A converter 423 for analogously converting MPEG decoded audio/video signal and outputting the converted MPEG decoded audio/video signal.

Figure 4:
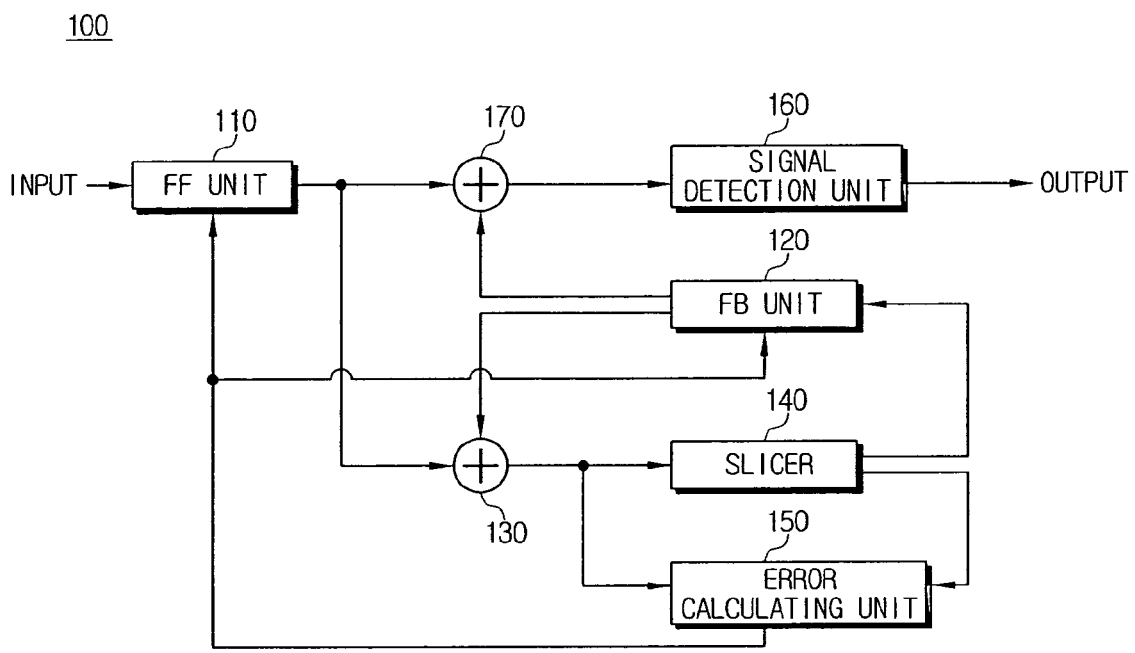
FIG. 4 is a schematic block diagram showing an embodiment of equalizer 100 according to the present invention.

FIG. 4 is a block diagram showing an embodiment of equalizer 100 of the optical recording/reproducing apparatus according to the present invention.

The equalizer 100 comprises FF unit 110, FB unit 120, a first adder 130, a slicer 140, an error calculating unit 150, a second adder 170, and a signal detection unit 160.

FF unit 110 has a feedforward filter, and removes pre-cursor from the inter-symbol interference of reproduced signal.

FB unit 120 has a feedback filter, and predicts and outputs post-cursor of the inter-symbol interference based on the feedback signal from the slicer 140. In other words, FB unit 120 predicts all of the post-cursor based on the feedback signal from the slicer 140 and outputs the post-cursor.

The first adder 130 and the second adder 170 add the signal having the pre-cursor removed by FF unit 110 to the post-cursor predicted by FB unit 120 to remove the inter-symbol interference.

The slicer 140 decides the signal outputted from the first adder 130 to be a predetermined level and inputs the predetermined signal to FB unit and the error calculating unit 150.

The error calculating unit 150 calculates equalizing error value based on the signal outputted from the first adder 130 and the signal outputted from the slicer 140. The equalizing error value calculated thus is inputted to FF unit 110 and FB unit 120 which update the tap coefficients of the respective filter based on the inputted equalizing error value.

The signal detection unit 160 utilizes any one of FDTS/DF method and FDTrS/DF method wherein the decision delay $(\tau) \geq 3$, and is provided with a predetermined number of delay elements (not shown) in correspondence with the reference clock of the optical recording/reproducing apparatus. In other words, by comparing the time during which the signal detection unit 160 is operated with the reference clock of the recording/reproducing apparatus and providing the signal detection unit 160 with a prescribed number of delay elements (not shown) in correspondence with the result of comparison, the output signal of the signal detection unit 160 is outputted after being delayed for a certain period of time by the prescribed number of delay elements, but is outputted in synchronization with the reference clock. Accordingly, it is possible to improve the operating speed of the equalizer 100. Here, the signal that is inputted to the signal detection unit 160 is the signal having the inter-symbol interference removed, outputted from the adder 170.

Figure 5:
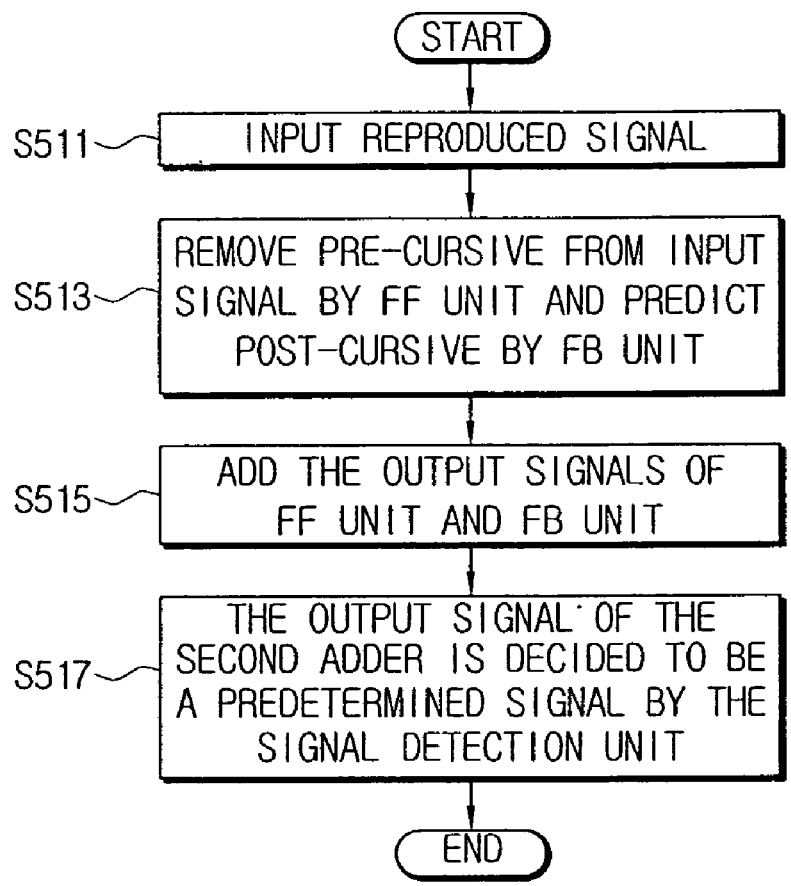
FIG. 5 is a flow chart explaining the operations of the equalizer 100 shown in FIG. 4.

FIG. 5 is a flow chart explaining the steps on the equalizing method of the equalizer 100 shown in FIG. 4. The equalizing process will be described in detail with reference to FIG. 5 below.

The equalizer 100 is inputted with reproduced signal of data recorded on optical recording medium by optical recording/reproducing apparatus (S511). The inputted signal includes pre-cursor and post-cursor caused by the inter-symbol interference. FF unit 110 removes the pre-cursor from the reproduced signal inputted. FB unit 120 predicts and outputs the post-cursor of the inter-symbol interference, based on the signal of the prescribed level decided by the slicer 140 (S513). The second adder 170 adds the signals of FF unit 110 and FB unit 120 (S515), the added signal being inputted to the signal detection unit 160. The signal detection unit 160 determines a prescribed signal using FDTS/DF method or FDTrS/DF method, depending on the set decision delay $(\tau)$ (S517). At this time, the signal from the signal detection unit 160 is outputted after being delayed for a certain period of time by the prescribed number of delay elements (not shown) provided in correspondence with the reference clock of the optical recording/reproducing apparatus.

On the other hand, the first adder 130 adds the respective signal of FF unit 110 and FB unit 120, the added signal being inputted to the slicer 140. The error calculating unit 150 calculates equalizing error value based on the signal from the first adder 130 and the signal from the slicer 140 and provides the equalizing error value to FF unit 110 and FB unit 120. FF unit 110 and FB unit 120 are equalized by adjusting the tap coefficients of the respective filter on the basis of the inputted equalizing error value.

In other words, the equalizer 100 inputs the signal added in the second adder 170 to the signal detection unit 160 and determines a signal with improved reliability using FDTS/DF method or FDTrS/DF method, thereby having more improved equalizing performance than the conventional equalizer of DFE structure.

Additionally, in the equalizer 100, the signal detection unit 160 is provided with a prescribed number of delay elements (not shown) corresponding to system clock, thereby having a fast equalizing speed that is a merit of DFE structure.

Figure 6:
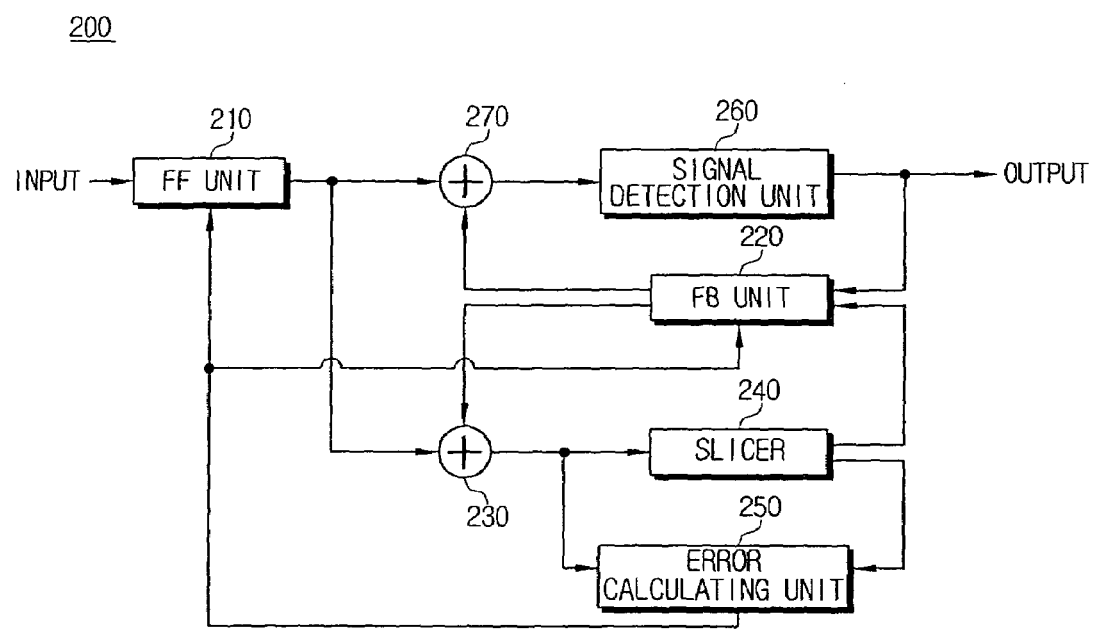
FIG. 6 is a schematic block diagram showing an embodiment of equalizer 200 according to the present invention.

FIG. 6 is a block diagram showing an embodiment of equalizer 200 according to the present invention.

The equalizer 200 comprises FF unit 210, FB unit 220, a first adder 230, a slicer 240, an error calculating unit 250, a second adder 270, and a signal detection unit 260.

FF unit 210 has a feedforward filter, and removes pre-cursor from the inter-symbol interference of reproduced signal.

FB unit 220 has a feedback filter, and predicts and outputs post-cursor of the inter-symbol interference based on the feedback signals from the slicer 240 and the signal detection unit 260. FB unit 220 predicts all of the post-cursor of the inter-symbol interference based on the feedback signal from the slicer and outputs the post-cursor, and predicts and outputs only the post-cursor except for decision delay ($\tau$) of all the post-cursor based on the feedback signal from the signal detection unit 260.

The first adder 230 adds the signal having the pre-cursor removed by FF unit 210 to the post-cursor predicted by FB unit 220 to remove the inter-symbol interference. At this time, the predicted post-cursor is all of the post-cursor predicted based on the feedback signal from the slicer 240.

The slicer 240 decides the level of the signal outputted from the first adder 230 to be a predetermined level and provides the predetermined value to FB unit 220 and the error calculating unit 250.

The error calculating unit 250 calculates equalizing error value based on the signals outputted from the first adder 230 and the slicer 240. The equalizing error value calculated thus is inputted to FF unit 210 and FB unit 220 which update the tap coefficients of the respective filter based on the inputted equalizing error value.

The signal detection unit 260 is provided with a predetermined number of delay elements (not shown) in correspondence with the reference clock of the optical recording/reproducing apparatus, and outputs the signal in the level which is decided by any one of FDTS/DF method and FDTrS/DF method wherein the decision delay ($\tau$)$\geq$3. At this time, the signal from the signal detection unit 260 is outputted after being delayed for a certain period of time by the prescribed number of delay elements (not shown), but is outputted in synchronization with the reference clock after the certain period of time, thereby enhancing the operating speed of the equalizer 200. Thus, the signal from the signal detection unit 260 is feedback to FB unit 220 after the certain period of time.

In other words, FB unit 220 predicts all of the post-cursor based on the feedback signal from the slicer 240 for a certain period of time, and predicts the post-cursor except for decided delay ($\tau$) based on the feedback signal from the signal detection unit 260 after the certain period of time.

The second adder 270 adds the signal having the pre-cursor removed by FF unit 210 to the post-cursor predicted by FB unit 220 based on the feedback signal from the signal detection unit 260, to remove inter-symbol interference. The signal from the second adder 270 is inputted to the signal detection unit 260, and outputted as a predetermined signal.

FIG. 7 is a flow chart explaining the steps on the equalizing method of the equalizer 200 shown in FIG. 6. The equalizing process will be described in detail with reference to FIG. 7 below.

The equalizer 200 is inputted with reproduced signal of data recorded on optical recording medium by optical recording/reproducing apparatus (S711). The inputted signal includes pre-cursor and post-cursor caused by the inter-symbol interference. FF unit 210 removes the pre-cursor from the reproduced signal inputted (S713). FB unit 220 predicts and outputs all of the post-cursor based on the feedback signal from the slicer 240 for a certain period of time, and predicts and outputs the post-cursor based on the feedback signal from the signal detection unit 260 after the certain period of time (S717). The second adder 270 adds the signals from FF unit 210 and FB unit 220 (S719), the added signal being inputted to the signal detection unit 260. The signal detection unit 260 determines a prescribed signal using FDTS/DF method or FDTrS/DF method, depending on the set decision delay ($\tau$) (S721).

On the other hand, the first adder 230 adds the signals from FF unit 210 and FB unit 220, the added signal being inputted to the slicer 240. The error calculating unit 250 calculates equalizing error value based on the signal from the first adder 230 and the signal from the slicer 240 and provides the equalizing error value to FF unit 210 and FB unit 220. FF unit 210 and FB unit 220 are equalized by adjusting the tap coefficients of the respective filter on the basis of the inputted equalizing error value.

Accordingly, FB unit 220 removes the post-cursor based on a more correct signal determined by the signal detection unit 260, thereby having improved equalizing performance. Also, it is possible to enhance the operating speed by changing the prescribed number of delay elements provided in the signal detection unit 260.

In other words, it is possible to prevent the equalizing speed from degrading while maintaining improved equalizing performance of the conventional equalizer of FDTS/DF method or FDTrS/DF method.

According to the present invention, in the equalizer of the optical recording/reproducing apparatus, it is possible to have more improved equalizing performance than the equalizer having a general DFE structure and have a faster equalizing speed than the equalizer having FDTS/DF method or FDTrS/DF method.

In other words, it is possible to realize a equalizer having a fast equalizing speed and improved equalizing performance.

Although the technical spirits of the present invention have been disclosed with reference to the appended drawings and the exemplary embodiments of the present invention corresponding to the drawings has been described, descriptions in the present specification are only for illustrative purposes, not for limiting the present invention.

Also, those who are skilled in the art will appreciate that various modifications, additions and substitutions are possible without departing from the scope and spirit of the present invention. Therefore, it should be understood that the present invention is limited only by the accompanying claims and the equivalents thereof, and includes the aforementioned modifications, additions and substitutions.

What is claimed is:

1. An equalizer of an optical recording/reproducing apparatus comprising:
   a feedforward (FF) unit having a feedforward filter for removing pre-cursor from inter-symbol interference of an input signal and outputting a FF output signal;
   a feedback (FB) unit having a feedback filter for predicting post-cursor of the inter-symbol interference and outputting a result of the prediction in a FB output signal;
   a first adder and a second adder, each for adding the output signal from the FF unit and the output signal from the FB unit, to remove the inter-symbol interference, and respectively outputting a first output signal and a second output signal;
   a slicer for deciding a level of the first output signal from the first adder to be a predetermined level and feeding back a predetermined level signal to the FB unit; and
   a signal detection unit for outputting the second output signal having the inter-symbol interference removed by the second adder as a predetermined signal, using at least one of a trellis structure method and a tree structure method.

2. The equalizer of claim 1, further comprising:
   an error calculating unit for calculating equalizing error value, using the first output signal from the first adder and the predetermined level signal from the slicer,
   wherein the FF unit and the FB unit update respective tap coefficients of the feedforward filter and the feedback filter based on the equalizing error value.

3. The equalizer of claim 1, wherein the signal detection unit comprises a given number of delay elements corresponding to a reference clock of the optical recording/reproducing apparatus, wherein the predetermined signal from the signal detection unit is outputted after being delayed for a certain period of time, and is outputted in synchronization with the reference clock after the certain period of time.

4. The equalizer of claim 1, wherein the trellis structure method and the tree structure method have a given decision delay ($\tau$), where $\tau \geq 3$.

5. An equalizing method of an optical recording/reproducing apparatus comprising:
   a step of removing pre-cursor from inter-symbol interference of input signal by a feedforward (FF) filter and outputting a FF output signal;
   a step of predicting post-cursor of the inter-symbol interference and outputting a result of prediction by a feedback (FB) filter in a FB output signal;
   a step of first adding the FF output signal having the pre-cursor removed and the FB output signal having the predicted post-cursor, to remove the inter-symbol interference and outputting a first output signal;
   a step of second adding the FF output signal having the pre-cursor removed and the FB output signal having the predicted post-cursor, to remove the inter-symbol interference and outputting a second output signal;
   a step of deciding a level of the first output signal from the first adding step to be a predetermined level and feeding back a predetermined level signal to the feedback filter; and
   a step of detecting the second output signal outputted from the second adding step as a predetermined signal, using at least one of a trellis structure method and a tree structure method.

6. The method of claim 5, further comprising the step of calculating equalizing error value using the first output signal outputted from the first adding step and the predetermined level signal and updating respective tap coefficients of the feedforward filter and the feedback filter.

7. The method of claim 5, wherein the signal from the detecting step is outputted after being delayed for a certain period of time by a given number of delay elements corresponding to a reference clock of the optical recording/reproducing apparatus, and is outputted in synchronization with the reference clock after the certain period of time.

8. The method of claim 5, wherein the trellis structure method and the tree structure method have a given decision delay ($\tau$), where $\tau \geq 3$.

9. An equalizer of optical recording/reproducing apparatus comprising:
   a feedforward (FF) unit having a feedforward filter for removing pre-cursor from inter-symbol interference of input signal and outputting a FF output signal;
   a feedback (FB) unit having a feedback filter for predicting post-cursor of the inter-symbol interference and outputting a result of prediction in a FB output signal;
   a first adder and a second adder, each for adding the output signal from the FF unit and the output signal from the FB unit, to remove the inter-symbol interference; and respectively outputting a first output signal and a second output signal; and
   a signal detection unit for detecting the second output signal from the second adder as a predetermined signal using at least one of a trellis structure method and a tree structure method, and feeding back the predetermined signal to the FB unit,
   wherein the FB unit predicts the post-cursor based on the predetermined signal that is feedback from the signal detection unit after a certain period of time.

10. The equalizer of claim 9, further comprising:
    a slicer for deciding a level of the first output signal from the first adder to be a predetermined level and feeding back a predetermined level signal to the FB unit; and
    an error calculating unit for calculating equalizing error value, using the first output signal from the first adder and the predetermined level signal from the slicer,
    wherein the FF unit and the FB unit update respective tap coefficients of the feedforward filter and the feedback filter based on the equalizing error value.

11. The equalizer of claim 9, wherein the signal detection unit comprises a given number of delay elements corresponding to a reference clock of the optical recording/reproducing apparatus, wherein the predetermined signal from the signal detection unit is outputted after being delayed for the certain period of time, and is outputted in synchronization with the reference clock after the certain period of time.

12. The equalizer of claim 9, wherein the trellis structure method and the tree structure method have a given decision delay ($\tau$), where $\tau \geq 3$.

13. An equalizing method of optical recording/reproducing apparatus comprising:
- a step of removing pre-cursor from inter-symbol interference of input signal by a feedforward filter and outputting a FF output signal;
- a step of predicting post-cursor of the inter-symbol interference and outputting the result of prediction by a feedback filter in a FB output signal;
- a step of first adding the FF output signal having the pre-cursor removed and the FB output signal having the post-cursor predicted, to remove the inter-symbol interference, and outputting a first output signal;
- a step of second adding the FF output signal having the pre-cursor removed and the FB output signal having the post-cursor predicted, to remove the inter-symbol interference, and outputting a second output signal; and
- a step of detecting the second output signal outputted from the second adding step as a predetermined signal, using at least one of a trellis structure method and a tree structure method and feeding back the detected predetermined signal to the feedback filter,
- wherein the step of detecting the second output signal outputted from the second adding step further inputting the detected predetermined signal to the feedback filter after a certain period of time.

14. The method of claim 13, further comprising:
- a step of deciding the first output signal outputted from the first adding step to be a predetermined level and feeding back the predetermined level signal to the FB unit; and
- a step of calculating equalizing error value using the first output signal outputted from the first adding step and the predetermined level signal and updating respective tap coefficients of the feedforward filter and the feedback filter.

15. The method of claim 14, wherein the predetermined level signal from the step of deciding the first output signal is outputted after being delayed for the certain period of time by a given number of delay elements corresponding to a reference clock of the optical recording/reproducing apparatus, and is outputted in synchronization with the reference clock after the certain period of time.

16. The method of claim 13, wherein the trellis structure method and the tree structure method have a given decision delay ($\tau$), where $\tau \geq 3$.

* * * * *